Figure 1:
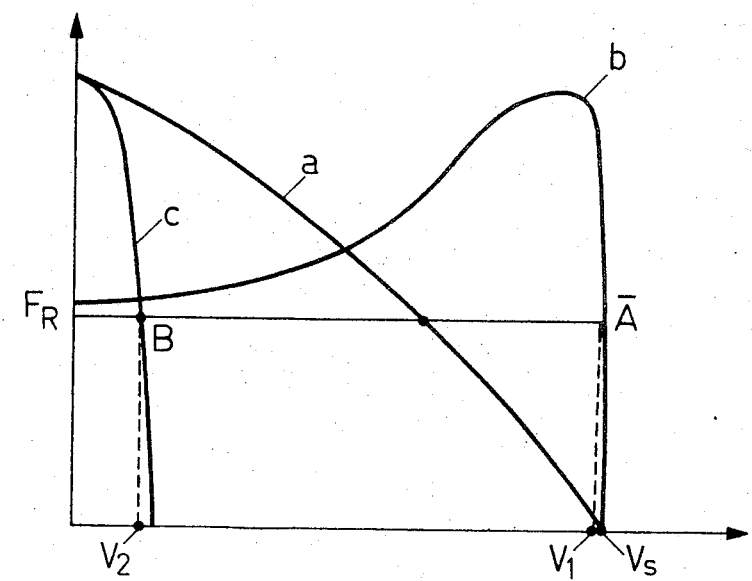

United States Patent [19]
Laronze

[11] 3,860,840
[45] Jan. 14, 1975

[54] LINEAR MOTOR WITH MULTI-SECTION ARMATURE AND A DRIVE DEVICE UTILIZING A LINEAR MOTOR OF THIS KIND

[75] Inventor: Joseph Laronze, Tassin La Demi-Lune, France

[73] Assignee: Brown Boveri & Company Limited, Bader, Switzerland

[22] Filed: July 17, 1973

[21] Appl. No.: 379,946

[30] Foreign Application Priority Data
July 31, 1972 France .............................. 72.27585

[52] U.S. Cl.............. 310/13, 104/148 LM, 310/264
[51] Int. Cl. ........................ H02k 41/02, B60m 1/30
[58] Field of Search ........... 310/12, 13, 15, 19, 264, 310/271, 273; 238/14.3; 104/148 LM

[56] References Cited
UNITED STATES PATENTS

| | | | |
|---|---|---|---|
| 3,407,749 | 10/1968 | Frig.............................. | 104/148 LM |
| 3,588,555 | 6/1971 | Laithwaite et al.................... | 310/13 |
| 3,616,763 | 11/1971 | Colling et al. ........................ | 310/13 |

*Primary Examiner*—Gerald Goldberg
*Attorney, Agent, or Firm*—Pierce, Scheffler & Parker

[57] ABSTRACT

An electrical linear motor includes an inductor component having one series of windings thereon energizable with alternating current and another series of windings thereon and which are energizable with direct current. The armature component of the motor is supported for movement longitudinally of the inductor component and includes at least three successive armature portions constituted by two portions which have a high electrical resistance characteristic longitudinally separated by an intermediate portion having a low electrical resistance characteristic.

19 Claims, 25 Drawing Figures

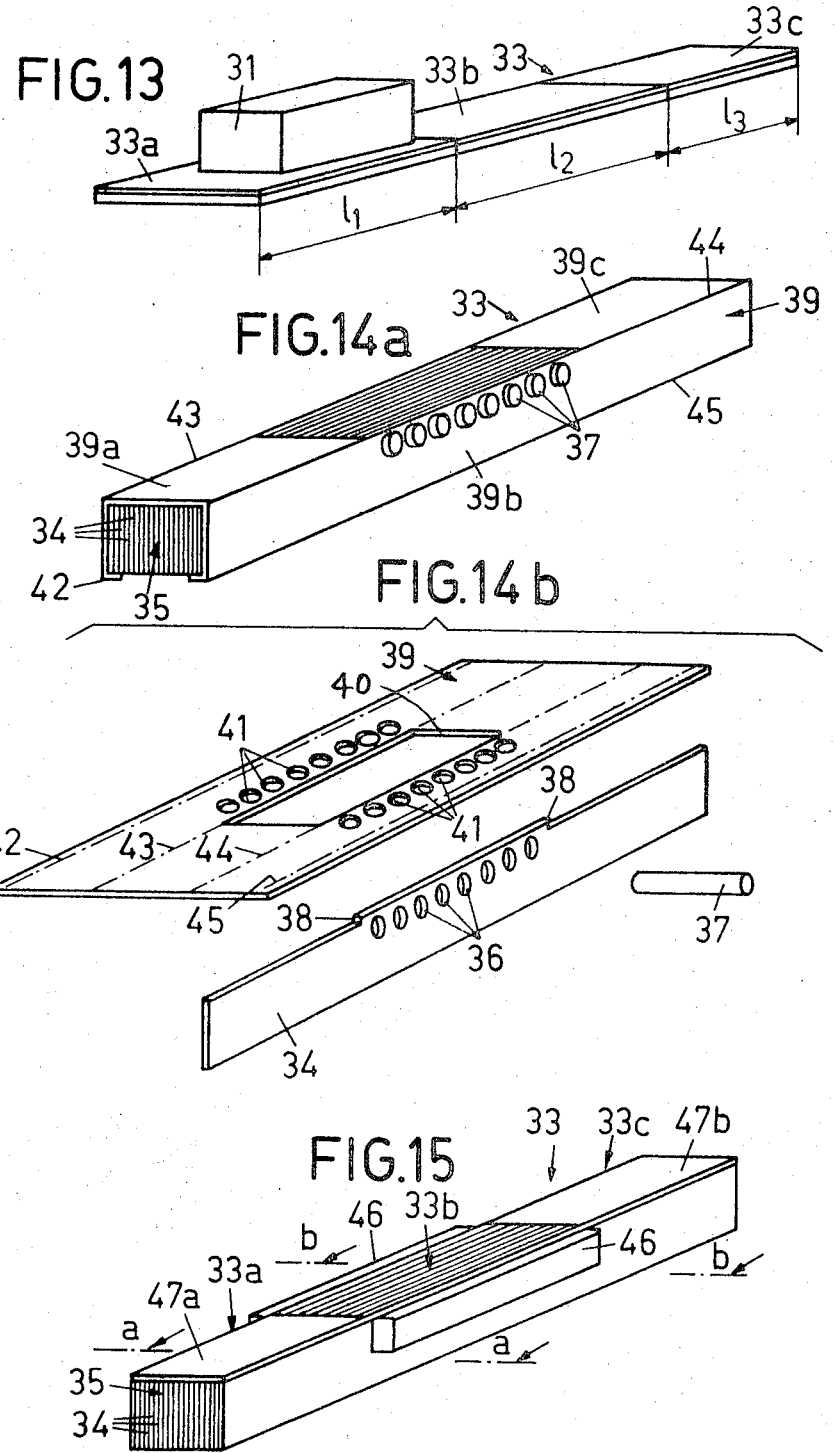

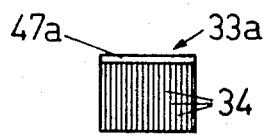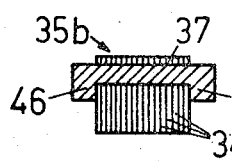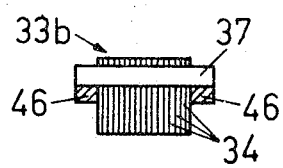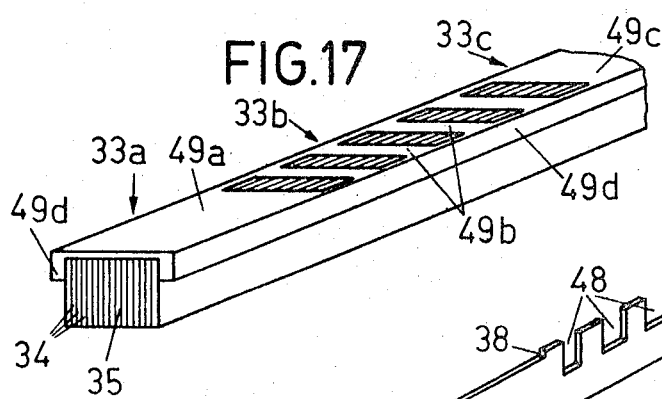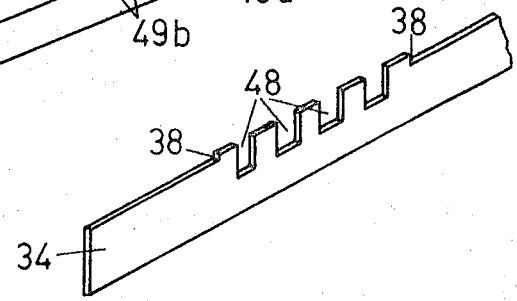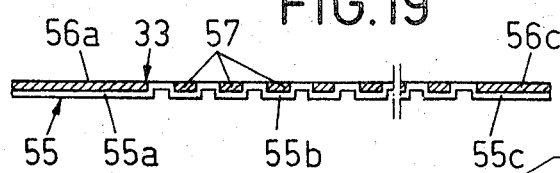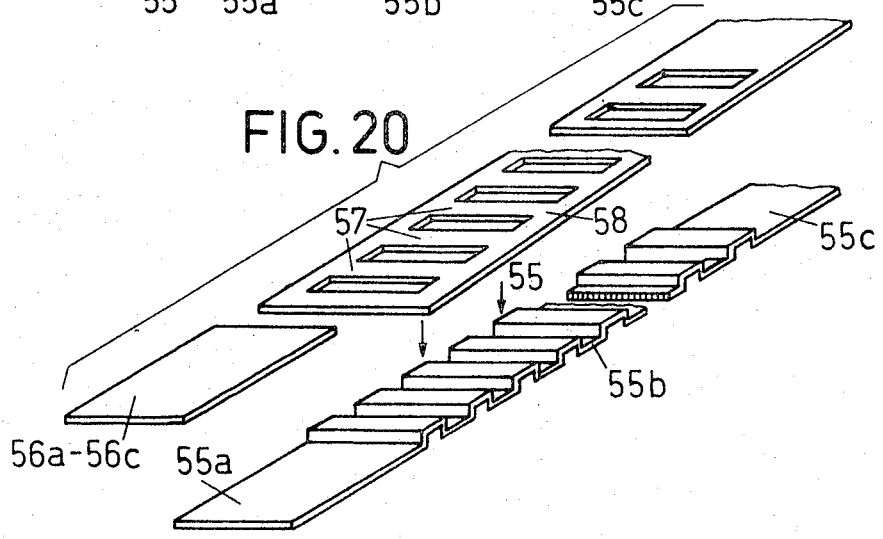

LINEAR MOTOR WITH MULTI-SECTION ARMATURE AND A DRIVE DEVICE UTILIZING A LINEAR MOTOR OF THIS KIND

The present invention relates to a linear motor having a multi-section armature, and also to a drive device utilizing a linear motor of this kind.

In a certain number of industrial applications it is required to move a movable object of unvarying mass along a prescribed path the length of which is constant; this is so, for example, in the case of the feeding of a machine with parts which are always identical, and also in the case of a sliding door.

In all these cases a starting force is required which is relatively great in relation to the force necessary for maintaining the movement, while the speed must be as constant as possible along the path, and finally the stop position must be approached as smoothly as possible. Furthermore, in most cases this movement must be reversible, for example, the positioning of the part on the machine and the release of the part when the desired operation has been effected by the machine, or the opening and closing of a door, and so on.

Since its reappearance in industry, the linear motor has seemed to be the ideal solution for movements of this kind. It provides in fact a great simplification because of the elimination of all mechanical intermediate parts which it permits, and it enables the cost of maintenance to be greatly reduced. Furthermore, the installation of a linear motor is less onerous than that of pneumatic or hydraulic power cylinders. On the one hand, in fact, it is easier to lay electric cables than to install compressed air piping or pipes for liquid under pressure, while on the other hand electric power is available almost everywhere, whereas a compressor is required for feeding pneumatic or hydraulic power cylinders.

Despite these indisputable advantages, it has been found in practice that the linear motor has not yet made it possible to achieve complete satisfaction in solving the problem indicated above. A certain number of delicate points in fact give rise to difficulties. In particular, the linear motor is sensitive to changes of supply voltage and to changes of temperature, which results in variations of speed which are incompatible with correct operation. If this disadvantage is overcome by the use of a suitable armature, for example, one with low electric resistance, of the so-called ladder type, an adequate starting force is no longer obtained and once again operation is not correct.

Finally — and this is the main disadvantage of known linear motors — it is very difficult to obtain very low speeds and consequently to achieve the smooth approach to the stop position.

For the purpose of overcoming these various disadvantages numerous solutions have been proposed, but almost all these solutions make use of complex electronic control. Furthermore, in addition to this complex electronic control, it is sometimes also necessary to use a pneumatic or hydraulic damping means to obtain the desired smooth approach, so that the originally intended simplicity, as compared with rotating electric motor drives, is no longer achieved.

The present invention has for its object to provide a linear motor which is simple to control.

To this end the linear motor according to the present invention, comprising an inductor composed essentially of a first inductor winding intended to be fed with alternating current and a second inductor winding intended to be fed with direct current, and also an armature, it characterized in that the armature is composed of at least three successive armature portions, namely, in the following order, a first portion having high electric resistance, a second portion having low electric resistance, and a third portion having high electric resistance.

The present invention also has for an object that of supplying a drive device utilizing a linear motor as defined above and making it possible for a movable object of unvarying mass to be moved along a prescribed path the length of which is constant.

The drive device according to the invention is characterized in that it comprises, in addition to the linear motor of the invention, a source of supply of alternating current and a source of supply of direct current, for the first inductor winding and the second inductor winding of the linear motor respectively, at least one proximity detector adapted to transmit the signal when the inductor and one of the two end portions of the armature of the linear motor, namely, the first and third portions, arrive opposite one another, and switch means which are controlled by the proximity detector in order to effect the feeding of direct current to the second winding of the inductor in response to the transmission of a signal by the proximity detector.

With the aid of an arrangement of this kind it is possible to obtain correct operation of the linear motor in the displacement of a movable object of unvarying mass along a path the length of which is constant, and it is possible to obtain a smooth approach to the stop position without it being necessary to use complex electronic control for this purpose.

Figure 2:
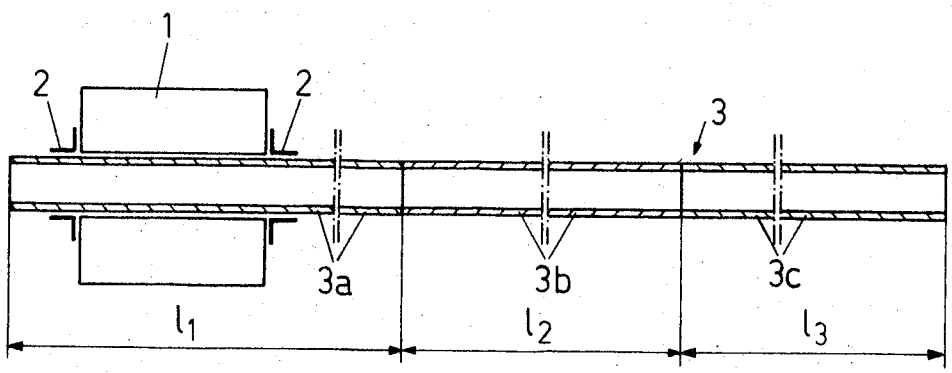
Figure 3A:
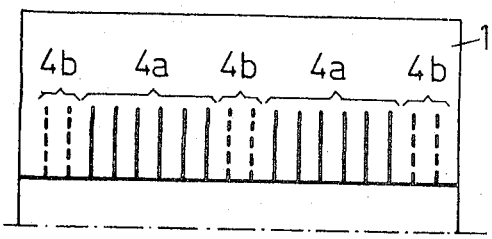
Figure 3B:
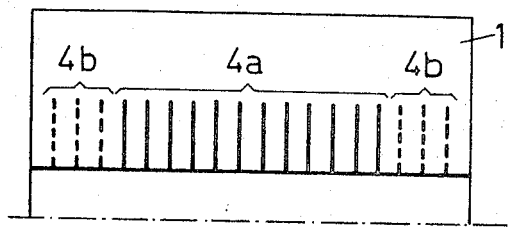
Figure 4A:
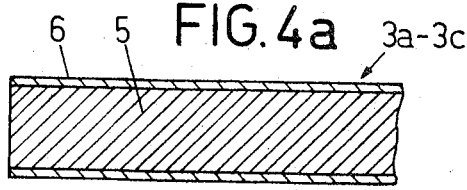
Figure 4B:
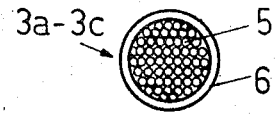
Figure 6:
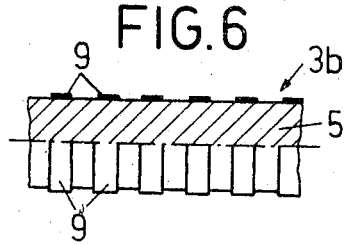
Figure 7:
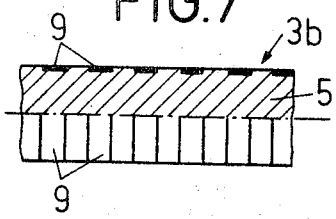
Figure 8:
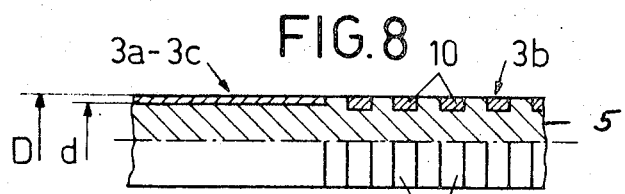

A detailed description will now be given of a number of embodiments of the present invention, with reference to the accompanying drawings, in which, FIG. 1 is a graph showing the thrust speed characteristic curves of a linear motor according to the present invention, FIG. 2 is a diagrammatical view of a linear motor according to the present invention, with a tubular inductor and a cylindrical armature, FIGS. 3a and 3b are diagrammatical half-views in axial section showing two possible ways of disposing the direct current and alternating current windings of the inductor of the linear motor shown in FIG. 2, FIGS. 4a, 4b are views in axial and cross-section respectively of the end portions of high electric resistance of the armature of the linear motor shown in FIG. 2, FIGS. 5, 6 and 7 are views, half in elevation and half in axial section, showing three possible ways of constructing the intermediate portion of low electric resistance of the armature of the linear motor shown in FIG. 2, FIG. 8 is a view, half in elevation and half in axial section, showing a possible way of producing in a single operation, the armature of the linear motor shown in FIG. 2.

Figure 9:
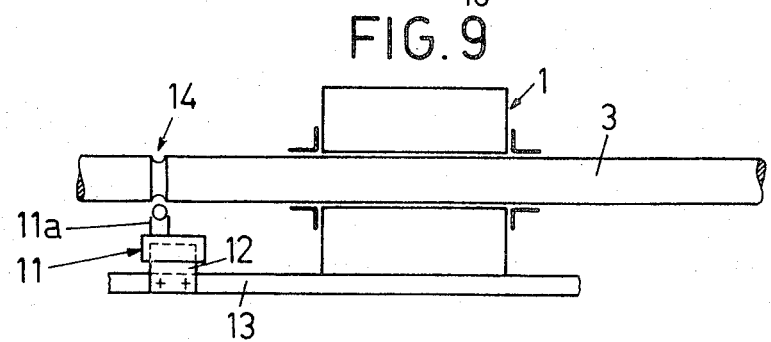
Figure 10:
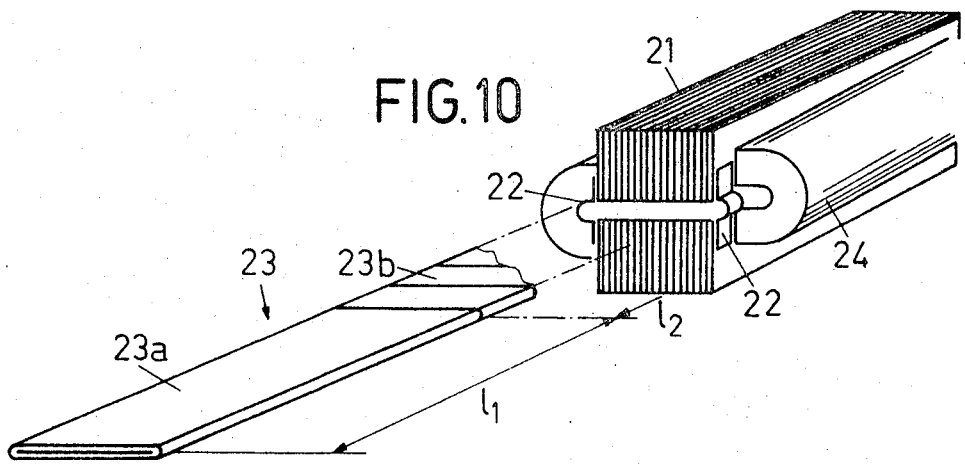
Figure 11:
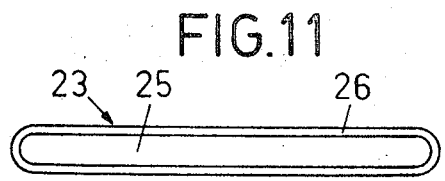
Figure 12:
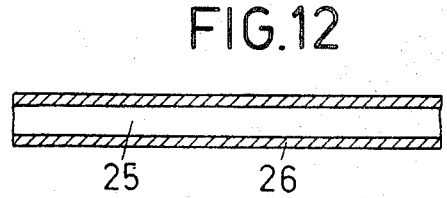

FIG. 9 is a diagrammatical view of the linear motor of FIG. 2, with which is associated a proximity detector for controlling the supply of direct current to the direct current winding of the inductor of the linear motor, FIG. 10 is a view in perspective, partly broken away, of a tubular rectangular linear motor according to another embodiment of the present invention, FIGS. 11 and 12 are views on a larger scale, in cross-section and longitudinal section respectively, of the armature of the linear motor shown in FIG. 10, FIG. 13 is a diagrammatical perspective view of a flat linear motor according to another embodiment of the present invention, FIG. 14a is a view in perspective of a construction of an armature which can be used in the linear motor of FIG. 13, FIG. 14b is an exploded view in perspective showing the various parts of which the armature shown in FIG. 14a is constructed, FIG. 15 is a perspective view of another construction of an armature capable of being used in the linear motor of FIG. 13, FIG. 16a is a cross-sectional view of one of the high-resistance portions of the armature shown in FIG. 15, FIG. 16b is a cross-sectional view of the low-resistance portion of the armature shown in FIG. 15, FIG. 16c is a similar view of FIG. 16b, showing an alternative construction for the low-resistance portion of the armature, FIG. 17 is a view in perspective of another construction of an armature capable of being used in the linear motor of FIG. 13, FIG. 18 is a view in perspective of one of the sheets serving to form the magnetic core of the armature of FIG. 17, FIG. 19 is a partial view in longitudinal section of another construction of an armature capable of being used in the linear motor of FIG. 13, and FIG. 20 is an exploded view in perspective of the various parts of which the armature shown in FIG. 19 is constructed.

If reference is first made to FIG. 2, there can be seen, in highly diagrammatical form, an example of construction of a linear motor according to the invention which comprises essentially a tubular inductor 1 provided with bearings 2 for guiding the armature 3 of cylindrical shape.

The inductor 1 carries two kinds of windings, namely, a first winding (not shown) intended to be fed with alternating current and a second winding (likewise not shown) intended to be fed with direct current. These two windings can be connected respectively to a source of supply of alternating current and to a source of supply of direct current (these sources not being shown) through the medium of connecting conductors and switching devices (not shown). The alternating current winding may be a multi-phase winding or a single-phase winding, in which case the alternating current supply source must be a source of multi-phase or single-phase current respectively. This selection, and also the selection of the number of poles, the pole pitch, the air gap width, and also other parameters may be made, in a manner known per se, on the basis of the operating conditions imposed, in order to obtain the desired speed and thrust characteristics. Furthermore, the supply of direct current may be obtained in a simple manner, and as is known per se, from the alternating current source by rectifying the supply of alternating current with the aid of suitable rectifying means.

FIGS. 3a and 3b show diagrammatically two possible arrangements for the direct current and alternating current windings of the inductor 1 of FIG. 2. In the example illustrated in FIGS. 3a and 3b, the inductor 1 has eighteen winding slots 4a, 4b, represented diagrammatically by vertical lines. Twelve of these slots, bearing the reference 4a (in solid lines) are intended to receive the alternating current, while the other six slots 4b (in broken lines) are intended to receive the direct current winding. In FIG. 3a, the six slots 4b are distributed in three groups of two slots, these groups being situated at each end and in the center of the inductor, while in FIG. 3b the six slots 4b are distributed in two groups of three slots, each of which groups is situated at one end of the inductor. The two arrangements shown in FIGS. 3a and 3b are obviously only examples, and any other arrangement may be contemplated. Thus, in particular, the slots intended to receive the direct current windings are not necessarily separate from the slots intended to receive the alternating current winding; the two windings may in fact be accommodated in the very same slots, said slots then being suitably dimensioned for this purpose.

If reference is made again to FIG. 2 it can be seen that according to one characteristic of the present invention the armature 3 is composed of three successive portions, namely, a first portion 3a of high electric resistance and having a length $l_1$, followed by a second portion 3b of low electric resistance and having a length $l_2$, and finally a third portion 3c of high electric resistance and having a length $l_3$.

As shown in FIGS. 4a and 4b, the armature portions 3a and 3c of high electric resistance are composed of a cylindrical core 5 of soft iron or soft steel covered by a coating 6 of non-magnetic conductive metal. The core 5 may be composed of a solid rod, as shown in FIG. 4a, or of a tube of soft steel or soft iron, or else by an aggregate of soft steel or iron wire which may or may not be bonded by a resin, such as a thermosetting resin, for example, FIG. 4b. The conductive metal layer 6 may be composed either of a tube fitting over the core 5 or by an electrolytic deposit of conductive metal on the core 5.

Figure 5:
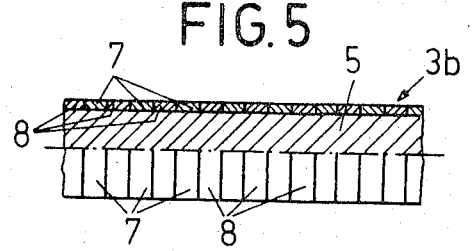

FIGS. 5, 6, and 7 illustrate various processes for producing an armature portion 3b of low resistance. This armature portion is generally composed externally of a succession of alternating zones of magnetic metal and of non-magnetic conductive metal. This succession of zones which are alternately magnetic and conductive may be obtained in various ways. In the construction shown in FIG. 5, rings of magnetic metal 7 and rings of conductive metal 8 are alternately stacked on a core 5, which is identical to the core described with reference to FIGS. 4a and 4b and which may be constituted by an extension thereof. FIGS. 6 and 7 show two other constructions of this succession of alternate magnetic and conductive zones, obtained by electrolytic deposition of conductive metal on a core 5 similar to that of FIGS. 4a, 4b and 5. In FIG. 6, the depositions of conductive metal 9 are effected direct, at regular intervals, on the core 5 and are in relief, which necessitates guide bearings 2, FIG. 2, sufficiently wide to bear on at least two of the deposits 9 in relief; the magnetic zones are then formed by the portions of the magnetic core 5 which are situated between the depositions of conductive metal 9. In FIG. 7 the depositions of conductive metal 9 are made in annular grooves previously formed in the peripheral surface of the core 5, and the outer surface of these depositions is flush with that of the core 5, thus making it possible to obtain an armature having a smooth external surface.

FIG. 8 is a view showing part of an armature according to the invention, which is produced in a single operation by moulding a conductor metal 10 over a core 5 of magnetic material. This core 5, which may be solid or hollow, has on its periphery, on the one hand, regularly spaced annular grooves in the central portion of the armature corresponding to the armature portion 3b of low electric resistance, and on the other hand, at each of its ends corresponding to the armature portions 3a and 3c of high electric resistance, only one of these portions being shown in FIG. 8, the core 5 has a diameter d smaller than the final diameter D on the armature. In order to obtain the armature shown in FIG. 8, the core 5 is placed in a cylindrical mould into which a molten conductor metal is poured. This metal fills the aforesaid annular grooves, on the one hand, and on the other hand covers the two ends of reduced diameter of the core 5. The three armature portions 3a, 3b, and 3c are thus obtained in a single operation.

The linear motor described above has thrust/speed characteristic curves of the kind shown in FIG. 1, in which the curve a corresponds to the case where the inductor 1 is located opposite one or the other of the armature portions 3a and 3c and in which only the alternating current winding is energized. Curve b corresponds to the case where the inductor 1 is located opposite the armature portion 3b and in which only the alternating current winding is energized, and curve c corresponds to the case in which the inductor 1 is located opposite either of the armature portions 3a or 3b and in which the alternating current winding and the direct current winding of the inductor are both energized.

The operation of the linear motor described above will now be described. It is assumed hereinbelow that the inductor is stationary and that the armature is fixed to the movable object which is to be displaced. It is, however, clearly understood that the opposite arrangement is also possible, that is to say the armature could be stationary and the inductor could be attached to the movable object to be displaced, one or the other solution being adopted depending on the application intended. This having been made clear, it will be assumed that at the outset, the armature portion 3a of high electric resistance is located opposite the inductor 1, as shown in FIG. 2. The alternating winding of the inductor is then energized and, as the case in which the thrust/speed characteristic is represented by curve a in FIG. 1 is being discussed, a large starting force is obtained. This force then decreases when speed increases. The armature having thus been set in motion through the action of this starting force, the second armature portion 3b of low electric resistance then comes opposite the inductor 1, and the case then arises in which the thrust/speed characteristic of the linear motor is represented by curve b in FIG. 1. As is well known in the case of linear motors having armatures with low electric resistance, this curve b has a portion which is practically vertical and in which the speed is practically insensitive to variations of voltage, temperature, and resisting force. Thus, for a given resisting force $F_R$, the operating point is situated at A on curve b, thus giving a speed $V_1$ which is practically invariable and close to the synchronism speed $V_s$. Finally, when all the armature portion 3b has moved past in front of the inductor 1 and the third armature portion 3c of high electrical resistance arrives opposite the said inductor 1, the direct current winding is energized through the action of a control device which will be described in detail later on, while the alternating current winding is kept under voltage. This has the effect of reducing the speed of the armature, and consequently of the moving object to which it is attached, the reduction of speed being the greater, the higher the direct current circulating in the direct current winding. The case then arises in which the characteristic of the linear motor is represented by curve c in FIG. 1. The operating point thus passes from point A to point B, so that the speed of the armature is reduced to a value $V_2$ substantially lower than the preceding value $V_1$.

Curve c assumes that the direct current winding is fed with a direct current of constant intensity. However, it would be entirely possible to supply the direct current winding by means of a generator capable of providing a direct current whose intensity increases linearly or non-linearly, or even in steps, as a function of time, in order to provide a system in which the closer the armature and the movable object associated therewith approach the stop position, the higher will be the intensity of the direct current and consequently the closer the operating point B will approach the ordinate axis, that is to say, the more the speed will be reduced. For operation of the linear motor in the opposite direction, everything that has just been said remains valid, with the exception that the direct current winding of the inductor is fed only when the armature portion 3a arrives opposite the inductor 1. The linear motor described above comprises only three armature portions, but it is obvious that the invention is not limited to an armature of this kind. The number of armature portions depends in fact on the desired operation. Thus, if the movable object to which the armature, or inductor, is attached has to describe a given course with a movement which may be broken down in p phases, the armature will then be composed of p different portions. Furthermore, when the movement of the movable object which is to be displaced must be perfectly reversible, the two end portions 3a and 3c of high electric resistance are identical and have the same length ($l_1 = l_3$), but it is obvious that this is only a particular case, and that the lengths $l_1$, $l_2$, and $l_3$ of the different armature portions, and also their respective electric resistances, may all be different from one another if operation so requires, for example, slower starting in one direction than the other, or different final approach speeds, etc.

There will now be described, with reference to FIG. 9, an example of construction of a control device which may be associated with the linear motor of FIG. 2 for the purpose of controlling the supply of the direct current winding of the inductor of this linear motor. In FIG. 9 can be seen a microcontact 11, carried by a cursor 12 adapted to slide on a graduated or ungraduated rule 13 fixed on the inductor 1 and extending parallel to the armature 3. In a suitable position this armature 3 is provided with a groove 14. When this groove 14 comes opposite the operating finger 11a of the microcontact 11, the latter brings about the closing of the direct current supply circuit of the direct current winding of the inductor. The microcontact 11 may itself be inserted in the direct current supply circuit, or it may be inserted in a control circuit adapted to transmit a signal which is used to effect the switching of a suitable switching means, such as a relay, switching transistor, or the like. The position of the microcontact 11 is adjustable along the rule 13, while locking means, not shown, may be provided to secure the cursor 12 in the desired adjusted position, so that it is thus possible to determine accurately the optimum moment for the supply of direct current to the direct current winding of the inductor.

Obviously, when the movement has to be reversible, the armature 3 must be provided with a groove 14 in each of its end portions. Furthermore, other microcontacts, which are similar to the microcontact 11 and which are likewise carried by the rule 13 and are adapted to cooperate with the groove 14 or with other grooves formed in the periphery of the armature 3, may also be provided for the purpose of controlling, for example, the stoppage of the supply of direct current and of the supply of alternating current at the end of the movement. Furthermore, it is obvious that instead of the microcontact or microcontacts, such as the microcontact 11 described above, it would be possible to use any other electromagnetic or electro-optical position or proximity detector capable of transmitting a signal which could be used for effecting the switching of a suitable switching means.

FIG. 10 shows another form of construction of a linear motor according to the present invention. This linear motor has an inductor 21 which carries windings 24 and is provided with bearings 22 for guiding the armature 23. According to the invention the windings 24 are of two kinds, namely, alternating current and direct current windings, and the armature 23 is composed of at least three successive portions, namely, a first portion 23a of high electric resistance followed by a second portion 23b of low electrical resistance and finally a third portion, not shown in FIG. 10 of high electric resistance. The general shape of the armature 23 is shown, on a larger scale, in FIGS. 11 and 12. As can be seen from these FIGS. the armature 23 is composed of a magnetic core 25 of elongated, flattened shape, which may be solid, as illustrated, or else hollow or laminated. This core 25 is covered by a layer of non-magnetic conductor metal 26. This layer 26 is uniform in the two armature portions of high electric resistance, and it is in the form of flattened rings regularly spaced apart in the longitudinal direction of the core, in the armature portion of low electric resistance. This layer of electric conductor metal 26 may be obtained by any of the processes indicated above in connection with FIGS. 4 to 8.

The operation of the linear rotor which is shown in FIg. 10 is the same as that described above in connection with the linear motor shown in FIGS. 2 and 5 to 8. In addition, the control of the supply of direct current to the direct current winding of the linear motor of FIG. 10 may be achieved with the aid of a device similar to that shown in FIG. 9.

FIGS. 13 to 20 relate to another embodiment of the present invention. This embodiment comprises a flat linear motor the basic diagram of which is shown in FIG. 13. As can be seen in this Fig. the flat linear motor comprises an inductor 31 carrying alternating current and direct current windings, not shown, and an armature 33 of flat, elongated shape which is adapted to move in the magnetic field generated by the inductor and which is composed of at least three successive portions, namely, a first portion 33a of high electric resistance, a second portion 33b of low electric resistance, and a third portion 33c of high electric resistance. The direct current and alternating current windings may be distributed in any way, and in particular the arrangement may be one of those described with reference to FIGS. 3a and 3b in connection with the tubular rectilinear motor of FIG. 2.

In this embodiment, the processes for the production of the armature described in connection with the tubular motor of FIG. 2 and illustrated in FIGS. 4 to 8 may again be used. Nevertheless, in the case of a flat linear motor armature the armature portion 33b of low electric resistance may be constituted by an actual "ladder." FIGS. 14a to 20 illustrate various processes for the production of such armatures.

The armature 33 shown in FIG. 14a is composed of a stack of sheets 34 of soft iron or soft steel, forming the magnetic core 35 of the armature. As FIG. 14b shows, each sheet is provided in each central portion, corresponding to the armature of low electric resistance, with a certain number of holes 36 which are aligned along one of the longitudinal edges of the sheet 34 and into which, when the sheets 34 are stacked, there are introduced bars 37 of conductor metal intended to form the rungs of the aforesaid "ladder." The end portions of the sheets 34 which correspond to the armature portions of high electric resistance have a slightly narrower width than the central portion of the sheets, so as to form shoulders 38 having a height substantially equal to the thickness of a plate 39 of conductor metal which is intended to form simultaneously the layers of conductor metal 39a and 39c of the armature portions 33a and 33c of high electric resistance and the "uprights" 39b of the "ladder" of the armature portion 23b of low electric resistance, and also to hold together the stack of sheets 34. As shown by FIG. 14b, the plate 39, here shown before folding, is provided in its central portion with a rectangular aperture 40 the length of which is equal to the distance between the shoulders 38. In addition, holes 41, the number of which is equal to the number of holes 36, are pierced in plate 39 along each of the longitudinal edges of the aperture 40. These holes 41 coincide with the holes 36 in the edge portions of the stack of sheets 34 when the plate 39 is folded around the fold lines 42 to 45. After the plate 39 has been folded over the stack of sheets 34, the bars 37, the ends of which project slightly from the sides of the resulting assembly, are riveted or brazed to the plate 39 forming the casing.

Although in the embodiment shown in FIGS. 14a and 14b the holes 36 have a circular shape and the bars 37 are in cylindrical form, it is obvious that they may have any other suitable shape, that indicated in FIGS. 14a and 14b being only an example which is in no way limitative.

In the embodiment described in FIG. 15, the sheets 34 have the same general shape as that shown in FIG. 14b. After a certain number of sheets 34 have been stacked so as to form the magnetic core 35, the armature portion 33b of low electric resistance may then be obtained by pouring a conductor metal into a suitable mould, in such a manner as to fill the holes 36 in the sheets 34 and form, in a single operation and as a single piece, the rungs 37 and the uprights 46 of the "ladder" of conductor metal, FIG. 16b. As an alternative, instead of producing the ladder by casting a conductor metal it would be possible, as in the embodiment illustrated in FIGS. 14a and 14b, to insert bars 37 into the holes 36 and then braze the projecting ends of these bars 37 on bars 46 forming the uprights of the "ladder," FIG. 16c. In either case, it is the uprights 46 of the ladder that effect the joining together of the sheets 34 to form a compact, strong packet. This packet of sheets having thus been produced, its end portions corresponding to the armature portions 33a and 33c of high electric resistance are covered by plates 47a and 47b respectively, which are of conductor metal. These plates 47a and 47b are fixed to the packet of sheets, for example, by adhesive bonding.

FIG. 17 shows in perspective another armature 33 in which the magnetic core 25 is formed by a packet of sheets 34 which have a similar shape to that shown in FIG. 14b, with the difference that the holes 36 are here replaced by slots 48, FIG. 18. The three armature portions 33a, 33b, and 33c are produced in a single operation by pouring the conductor metal into a mould of suitable shape so as to form simultaneously conductive layers 49a and 49c at the end portions of the packet of sheets corresponding respectively to the armature portions 33a, and 33c, the ladder rungs 49b in the notches 48 and finally the uprights 49d of the "ladder." Here again the cast and moulded conductive metal also serves to join together the sheets 34.

In the embodiment shown in FIGS. 19 and 20, the core 55 of the armature 33 is constituted by a plate of soft steel or soft iron, which is flat in its end portions 55a and 55c corresponding respectively to the armature portions 33a and 33c of high electric resistance, and which, in its central portion 55b corresponding to the armature portion 33b of low electric resistance, has corrugations having a square wave form. The end portions 55a and 55c of the plate forming the magnetic core 55 are covered respectively by plates 56a and 56c of conductor metal, which have a thickness such that they reach the level of the crests of the corrugations of the central portion 55b of the magnetic core. Between the crests of the corrugations are provided cavities intended to receive bars 57 of conductor metal. These bars 57 are formed from a plate 58 cut out so as to form a ladder, as illustrated in FIG. 20.

The flat linear motor described above with reference to FIGS. 13 to 20 has only a single inductor, but it is obvious that, as is known per se, it would be possible to provide two inductors disposed one on each side of the armature, in which case the armature must have, on the side adjacent the second inductor another conductive layer which is successively continuous, ladder-like, and then continuous in order to form successive armature portions of high electric resistance, low electric resistance, and high electric resistance, similar to the portions 33a, 33b, and 33c facing the first inductor.

Furthermore, the flat linear motor has thrust/speed characteristics similar to those shown in FIG. 1, and it functions in a similar manner to that described in connection with the tubular linear motor of FIG. 2.

As already indicated above, the linear motor of the present invention may advantageously be used for driving a sliding door, for feeding a machine with parts to be machined or else, in a general way, in all applications where it is necessary to move a movable object of constant mass on a path of constant length. Furthermore, the lengths $l_1$, $l_2$, and $l_3$ of the successive armature portions may be given any relative values. As a rule the length $l_2$ will be substantially greater then the lengths $l_1$ and $l_3$, and in cases where the movement is to be perfectly reversible, these last two lengths will be equal.

It is well understood that the embodiments which have been described above are given solely by way of example and without limitation in any way, and that numerous modifications may be made without thereby departing from the scope of the present invention.

I claim:

1. An electrical linear motor comprising an inductor component including thereon a series of first winding means energizable with alternating current and a series of second winding means thereon and which are energizable with direct current, an elongated armature component supported for longitudinal movement relative to said inductor component, one of said components being stationary and the other being connectible to an object to be moved from standstill along a prescribed path from one position to another, said armature component comprising three successive armature portions constituted by two portions having a high electrical resistance characteristic longitudinally separated by an intermediate portion having a low electrical resistance characteristic, said inductor component being located opposite one of the high resistance portions of said armature when the object is at standstill, said series of first winding means on said inductor component when energized with alternating current serving to effect a starting movement of the object-connected component of the motor, a proximity detector associated with said armature component and which produces a signal when the other high resistance portion of said armature and said inductor component come into proximity with each other, and switch means controlled by the signal produced by said proximity detector for effecting energization of said series of second winding means on said inductor component with direct current thereby to reduce the speed of said object-connected component of the motor.

2. A linear motor as defined in claim 1 wherein said inductor component has a tubular configuration and wherein said armature component is constituted by an elongated core of magnetic metal, said core being covered with a layer of electrically conductive metal which is uniform at those portions represented by a high electrical resistance characteristic and which is discontinuous and forms alternately located electrically conductive and magnetic annular zones at the intermediate armature portion represented by a low electrical resistance characteristic.

3. A linear motor as defined in claim 2 wherein said layer of conductive metal is applied to said core by depositing the same electrolytically.

4. A linear motor as defined in claim 2 wherein said layer of conductive metal is applied to said core by casting the metal over the core.

5. A linear motor as defined in claim 2 wherein said layer of electrically conductive metal at those portions of the core having a high electrical characteristic is composed of a tubular element fitted on the core, and at the intermediate portion having a low electrical resistance characteristic is composed of a succession of annular elements fitted on the core and which are alternately made from electrically conductive metal and of magnetic metal respectively.

6. A linear motor as defined in claim 2 wherein said core has a cylindrical configuration.

7. A linear motor as defined in claim 6 wherein said core has a cylindrical solid configuration.

8. A linear motor as defined in claim 6 wherein said core has a cylindrical hollow configuration.

9. A linear motor as defined in claim 2 wherein said core has a flattened configuration.

10. A linear motor as defined in claim 9 wherein said core has a solid configuration.

11. A linear motor as defined in claim 9 wherein said core has a laminated configuration.

12. A linear motor as defined in claim 2 wherein said core has a cylindrical configuration and is composed of wires.

13. A linear motor as defined in claim 1 wherein both the inductor and armature components have a flat configuration, said armature component being constituted by a packet of elongated sheets of magnetic metal which is covered at least on one face by a layer of electrically conductive metal which is uniform at each portion of the armature which exhibits high electrical resistance characteristic and which is provided with openings receiving spaced parallel bars of electrically conductive metal at that portion of the armature which exhibits the low electrical resistance characteristic, said bars being parallel to said face and transverse to the longitudinal direction of said armature and electrically connected to one another.

14. A linear motor as defined in claim 13 wherein said bars of electrically conductive metal are constituted by rods inserted into holes pierced in the sheets of magnetic metal and said rods are connected electrically together by electrically conductive members secured to the opposite ends of said rods.

15. A linear motor as defined in claim 13 wherein said bars of electrically conductive metal and the electrical connections therebetween are produced by casting of the metal.

16. A linear motor as defined in claim 13 wherein said uniform portions of said electrically conductive metal, as well as said parallel spaced bars and the electrical connections therebetween are produced in a single piece by casting of the metal.

17. A linear motor as defined in claim 1 wherein both the inductor and armature components have a flat configuration, said armature component being constituted by a magnetic core composed of an elongated plate of magnetic metal, said plate being planar at those spaced portions which exhibit a high electrical resistance characteristic and said plate being corrugated at the portion thereof which exhibits a low electrical resistance characteristic, said plate of magnetic metal being covered at its planar portions with a plate of electrically conductive metal and being covered at its corrugated portion by another plate of electrically conductive metal cut out in the form of a "ladder" the rungs of which are located in the hollows of the corrugations.

18. A linear motor as defined in claim 1 wherein said proximity detector is comprised of a microcontact which occupies a fixed portion in relation to said inductor component and which includes an operating finger adapted to be actuated by a groove formed in said armature component.

19. A linear motor as defined in claim 18 and which further includes a cursor supporting said microcontact, said cursor being mounted on a rule for sliding movement therealong, and said rule being fixed to and extending parallel with said inductor component and armature component thereby to enable said microcontact to be adjusted in a direction longitudinally of said armature component for adjusting the moment when said series of second winding means on said inductor component are energized with direct current.

* * * * *

UNITED STATES PATENT OFFICE
CERTIFICATE OF CORRECTION

Patent No. 3,860,840    Dated January 14, 1975

Inventor(s) JOSEPH LARONZE

It is certified that error appears in the above-identified patent and that said Letters Patent are hereby corrected as shown below:

[73] Assignee:   BBC Brown Boveri & Company Limited

Baden, SWITZERLAND

Signed and sealed this 29th day of April 1975.

(SEAL)
Attest:

RUTH C. MASON
Attesting Officer

C. MARSHALL DANN
Commissioner of Patents
and Trademarks